United States Patent [19]

Harigaya et al.

[11] Patent Number: 4,696,440
[45] Date of Patent: Sep. 29, 1987

[54] INFORMATION SIGNAL AND/OR REPRODUCING APPARATUS

[75] Inventors: Isao Harigaya; Kouji Takahashi, both of Kanagawa, Japan

[73] Assignee: Canon Kabushiki Kaisha

[21] Appl. No.: 919,540

[22] Filed: Oct. 15, 1986

Related U.S. Application Data

[63] Continuation of Ser. No. 727,584, Apr. 26, 1985, abandoned.

[30] Foreign Application Priority Data

Apr. 28, 1984 [JP] Japan .................................. 59-86888

[51] Int. Cl.⁴ ........................ B65H 61/00; G03B 1/16
[52] U.S. Cl. .................................. 242/191; 242/75.45
[58] Field of Search ................. 242/184, 186, 75.45, 242/75.47, 191, 196, 206, 207, 208

[56] References Cited

U.S. PATENT DOCUMENTS

| | | |
|---|---|---|
| 3,811,640 | 5/1974 | Nagahiro et al. .................... 242/191 |
| 3,849,661 | 11/1974 | Beiter .............................. 242/191 X |
| 3,850,384 | 11/1974 | Priest ................................. 242/191 |
| 4,001,552 | 1/1977 | Muller ............................ 242/191 X |
| 4,084,768 | 4/1978 | Hayoshi .......................... 242/191 X |
| 4,232,371 | 11/1980 | Kamoto .......................... 242/191 X |
| 4,366,371 | 12/1982 | d'Arc et al. ..................... 242/191 X |
| 4,408,335 | 10/1983 | d'Arc et al. ..................... 242/191 X |

*Primary Examiner*—Donald Watkins
*Attorney, Agent, or Firm*—Toren, McGeady & Associates

[57] ABSTRACT

In the disclosed apparatus for recording and/or reproducing information on or from a tape-shaped record bearing medium wound around a pair of reels allowing the medium to travel in the longitudinal direction, a detector detects the rotating speed of at least one of the pair of reels; a circuit computes the amount of the tape-shaped record bearing medium on one of the reels in response to the output of the detector; a display displays the output of the circuit; and an adjusting device adjusts the degree of display precision of the display on the basis of the output of the detector.

11 Claims, 6 Drawing Figures

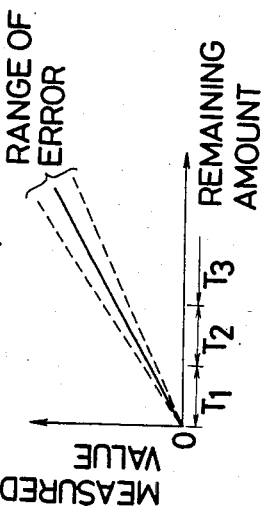
FIG.1
PRIOR ART
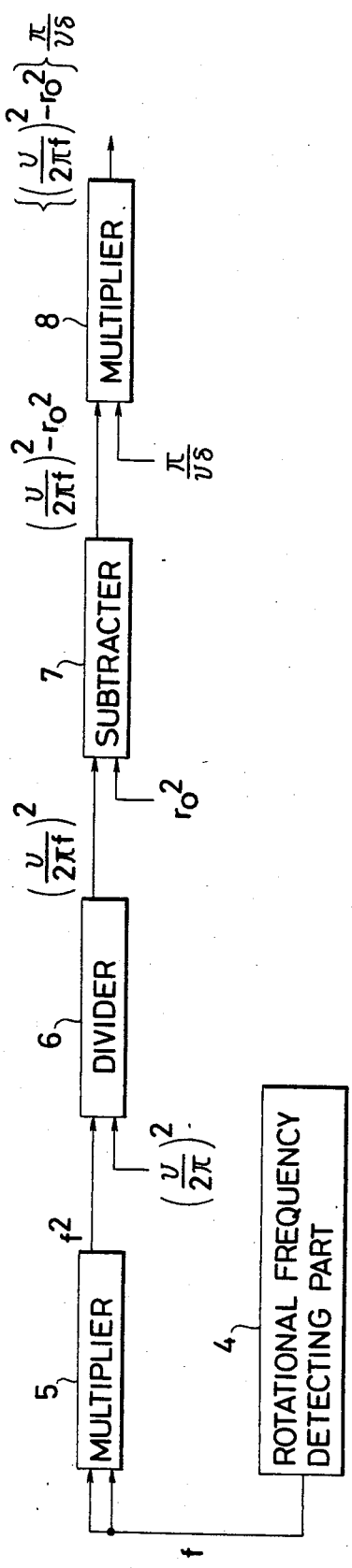
FIG.2
PRIOR ART
FIG.3
PRIOR ART

INFORMATION SIGNAL AND/OR REPRODUCING APPARATUS

This is a continuation of application Ser. No. 727,584, filed Apr. 26, 1985, now abandoned.

BACKGROUND OF THE INVENTION

1. Field of the Invention

This invention relates to an information signal recording and/or reproducing apparatus, and more particularly, to a recording and/or reproducing apparatus performing a recording or reproducing operation on a tape-shaped record bearing medium wound around a pair of reels.

2. Description of the Prior Art

In conventional recording and/or reproducing devices such as video tape recorders, audio tape recorders, etc., information on the amount of tape used or remaining has been obtained by computing the amount of tape wound on one of the reels. Such computations have utilized the fact that the rotating speed of the supply reel or the take-up reel varies as the coil diameter of the tape or the reel varies. The computed information is displayed in various ways. Among the various known methods for carrying out such functions, some are simple arrangements compute the remaining amount of the tape on the supply reel by detecting the rotating speed of the supply reel and displaying the information.

In an apparatus arranged to obtain information concerning the remaining amount of tape, the detected tape computed can differ from the actual remaining tape because of variations or unevenness in the thickness of the tape and in the winding and tightening force exerted on the tape. In other words, the rotating speed varies because of these factors. Variations in the computed remaining amount of tape due to variations in the rotating speed and, therefore, the error, become larger as the coil diameter of the reel increases. These variations result in erroneous displays of the information on the remaining amount of tape. The displays sometimes indicate increasing amounts of tape while the actual amount of tapes remaining is gradually decreasing. This fosters mistrust and uncertainty in the mind of the operator. Further, where there is only a small amount of tape remaining, precise information on the remaining amount of tape is required. However, in such cases, the conventional display arrangement has failed to meet such precision requirements and caused great inconvenience and inaccuracy of measurement.

SUMMARY OF THE INVENTION

It is therefore a principal object of this invention to eliminate the above-stated inconvenience caused by the conventional apparatus.

It is a more specific object of the invention to provide a recording and/or reproducing apparatus capable of precisely displaying, when necessary, the information on the amount of a tape-shaped record bearing medium wound around one of a pair of reels with a high degree of reliability.

To achieve these objects, an information signal recording and/or reproducing apparatus embodying an aspect of this invention is arranged to record and/or reproduce an information signal on or from a tape-shaped record bearing medium wound around a pair of reels by allowing the medium to travel in the longitudinal direction thereof and is constructed with a detector element for detecting the rotating speed of at least one of the pair of reels; a computer circuit for computing the amount of the tape-shaped record bearing medium wound on one of the pair of reels in response to the detection output of the detector; a display element for displaying information on the basis of the output of the computing element; and an adjusting element for adjusting the degree of display precision of the display element on the basis of the output of the detector.

The above and further objects and features of this invention will become apparent from the following detailed description of a preferred embodiment thereof taken in connection with the accompanying drawings.

BRIEF DESCRIPTION OF THE DRAWINGS

FIG. 1 is an illustration showing a computing method for obtaining the remaining amount of a tape from the rotational frequency of a reel.

FIG. 2 is a block diagram showing a specific example of a computing circuit arranged to obtain the remaining amount of tape from the rotational frequency of a reel.

FIG. 3 is a graph showing a relation between the measured value of the remainder of tape obtained by computation and the actual value of the remainder of tape.

DETAILED DESCRIPTION OF THE PREFERRED EMBODIMENT

Figure 4:
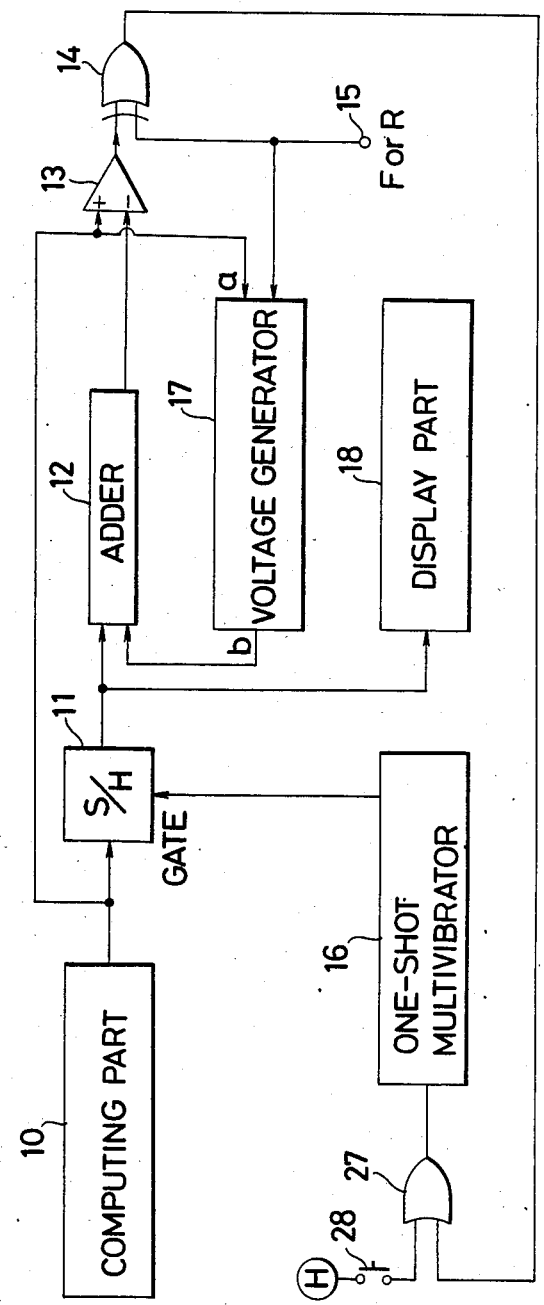
FIG. 4 is a block diagram showing the arrangement of a tape remainder display part of a tape recorder embodying this invention as an embodiment thereof.

In the following description of an embodiment, this invention is applied to a tape recorder provided with a tape remainder display function. Referring first to FIG. 1, a computing method used for obtaining the remaining amount of tape from the rotational frequency of a reel will be described:

A supply reel hub 1 has a radius rO. A tape portion 2 wound around the supply reel hub 1 has an outside diameter r. A tape 3 is arranged to be played out from the supply reel at a constant speed. Assuming that the thickness of the tape is $\delta$ and the rotational frequency of the supply reel is f, the remaining amount T (in the unit of time) can be expressed as follows:

$$T = \frac{\pi(r^2 - r_0^2)}{v \cdot \delta} \quad (1)$$

$$r = \frac{v}{2\pi f} \quad (2)$$

Formula (1) can be rearranged into the following Formula by substituting Formula (2) into Formula (1):

$$T = \left\{ \left(\frac{v}{2\pi f}\right)^2 - r_0^2 \right\} \frac{\pi}{v\delta} \quad (3)$$

In Formula (3), all the values $v$, $\pi$, $r_0$ and $\delta$ are predetermined values. The remaining amount of tape (T), therefore, can be detected when the rotational frequency f of the reel is obtained.

Referring to FIG. 2, which shows in a block diagram a circuit arrangement required for carrying out the above-stated computation, a rotational frequency detecting part 4 is arranged to detect the rotational frequency f of the reel. A signal having a frequency corresponding to the rotation of the reel is produced from the detecting part 4 by means of a hall element or a magnetic circuit element (head) or the like. This signal is counted within a predetermined period of time. A counted value thus obtained is used as the rotational frequency f. These values f are then multiplied by each other at a multiplier 5 to obtain a value $f^2$. Then, at a divider 6, a constant $(v/2\pi)^2$ is divided by this value $f^2$. Further, the output of the divider 6 is supplied to a subtracter 7 to have a constant $r_0^2$ substracted therefrom. The output of this subtracter 7 is supplied to another multiplier 8 to be multiplied by a constant $\pi/v\delta$ to obtain the measured remaining amount T of the tape as expressed by Formula (3) above.

FIG. 3 shows the ralation of the measured value T of the remaining amount of tape thus obtained to the actual remaining amount of tape. Generally, the accuracy of the measured value is affected most by unevenness of the thickness of tape. Therefore, the greater the remaining amount of tape, the more the accuracy of the measured value (or the computed value) decreases.

FIG. 4 shows the arrangement of a tape remainder display part of the tape recorder arranged according to this invention as an embodiment thereof. Referring to FIG. 4, a computing part 10 corresponding to the arrangement shown in FIG. 2 is arranged to produce an output representing the above-stated measured value T. A sample-and-hold circuit (hereinafter referred to a S/H) 11 is arranged to produce an output which is displayed at a display part 18.

Figure 5:
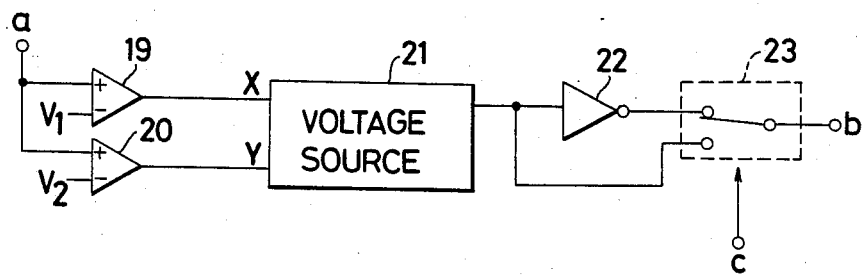
FIG. 5 is a circuit diagram showing by way of example the specific arrangement of a voltage generator shown in FIG. 4.
Figure 6:
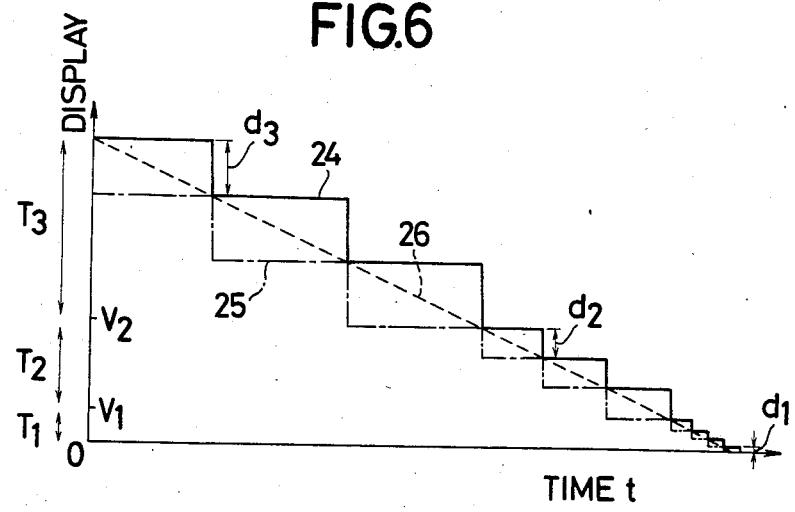
FIG. 6 is a timing chart showing the wave forms obtained in various parts of the embodiment shown in FIG. 4.

FIG. 6 is a timing chart showing the wave forms obtained in the various parts of the circuit arrangement of FIG. 4. In FIG. 6, a full line 24 represents the output of the S/H 11. A one-dot-chain line 25 represents the output of the adder 12. A broken line 26 represents the output of the computing part 10. FIG. 5 shows by way of example the details of circuit arrangement of the voltage generator 17 of FIG. 4. The operation of the embodiment is as described below with reference to the timing chart of FIG. 6.

When a switch 28 is momentarily turned on at the zero point of time t of FIG. 6 or a display start point for the purpose of effecting first sampling, the level of one of the inputs of an OR gate 27 becomes a high level (hereinafter referred to as H for short). This switch 28 is arranged, for example, to turn on when the travel of the tape becomes stable after the tape begins to travel. Then, the output level of the OR gate 27 changes to H from a low level (hereinafter referred to L for short). The H output of the OR gate 27 triggers the one-shot multivibrator 16. This causes the S/H 11 to sample and hold the computation output of the computing part 10.

The output of the S/H 11 is added together with the output of the voltage generator 17 by the adder 12. The addition output of the adder 12 is as represented by the one-dot-chain line 25 of FIG. 6. The output of the voltage generator 17 varies with remaining amount of the tape, as will be described in further detail later. For example, the absolute value of the voltage output of the generator 17 changes to d1, d2 and d3 with the remaining amount of tape within the ranges of values T1, T2 and T3. These values d1, d2 and d3 define the degree of precision of the display to be made by the display part 18.

A comparator 13 is arranged to compare the computation output 26 of the computing part 10 with the output 25 of the adder 12. The output level of the comparator 13 becomes H when the computation output 26 is larger than the addition output 25 and becomes L when the former is smaller than the latter. A terminal 15 is arranged to receive an H input when the reel rotates in a normal direction (in which the remainder of tape decreases) and an L input when the reel rotates in a reverse direction. Assuming that the reel is rotating in the normal direction, the output level of the comparator 13 changes from H to L when the computation output 26 becomes smaller than the addition output 25. As a result, the output level of an exclusive OR circuit (EXOR) 14 changes from L to H. Then, the one-shot multivibrator 16 is triggered to render the S/H 11 operative. The output of the S/H change as much as the output of the voltage generator 17. Assuming that the output of the voltage generator 17 is at the value d3 when the computation output 26 is within the range T3 of FIG. 6, at the value d2 when the computation output 26 is within the range T2 and at the value d1 when the output 26 is within the range T1, the output of the S/H 11 is as represented by the full line 24 in FIG. 6.

The details of the voltage generator 17 of FIG. 4 are as shown in FIG. 5. The voltage generator 17 includes a terminal "a" arranged to receive the computation output of the computing part 10. The computation output thus received is compared with a value V1 at a comparator 19 and with a value V2 at a comparator 20. As shown in FIG. 6, the values V1 and V2 are threshold voltage values determining voltage ranges T1, T2 and T3. Therefore, the remaining amount of tape can be determined whether within the range T1, T2 or T3. A voltage source 21 is arranged to produce a voltage d1, d2 or d3 according to data X and Y obtained from the comparator 19 and 20. More specifically, the voltage d3 is produced when both the data X and Y are at H levels; the voltage d2 is produced when the data Y is alone at H; and the voltage d1 is produced when the levels of both the data X and Y are L.

A terminal "c" of FIG. 5 is arranged to receive a signal indicative of the rotating direction of the reel and is supplied to the terminal 15 of FIG. 4. An analog switch 23 is controlled by this signal. A voltage output which comes through an analog inverter 22 or a voltage which does not come through it is thus produced from a terminal "b". This voltage output is supplied to the adder 12. Since the remaining amount of tape decreases in the normal rotation of the reel, the output is a negative voltage which comes via the inverter 22. The voltages d1, d2 and d3 are arranged to correspond to the amounts of tape which, for example, correspond to the tape travel lengths in 1, 5 and 10 minutes.

In accordance with the arrangement described, the displayed data always changes only in one direction. Therefore, it precludes the possibility of an erroneous display of a remaining tape amount as increasing while the tape is in actuality travelling in the direction of decreasing the remaining amount thereof. Further, for a large remaining amount of tape, the accuracy of the computation output degrades. In this event, the display variations become coarse. Therefore, the changing interval of the displayed data on the ramaining amount of tape does not very much and thus the display varies at almost unvarying intervals to make it easily observable by the operator. Meanwhile, for a small remaining amount of tape, the degree of precision of the computation output becomes better and the display comes to be more finely adjusted or renewed to enable the operator to accurately assess the remaining amount of the tape.

In the embodiment described, the remaining amount of tape is computed by detecting the rotating speed (or rotational frequency) of the supply reel. The invention is, however, not limited to this but is also applicable where the rotating speeds of both the supply and take-up reels are detected and the remaining amount of tape is computed by using the ratio between them.

Further, where the used amount of tape is to be detected instead of the remaining amount, if the precision of computation is not satisfactory, the same advantageous effect is attainable by lowering the degree of display precision. The display precision is arranged to be lowered by processing the computation signal to change the unit of display in such a manner as to be applicable to any kind of display devices. However, the same advantageous effect is attainable by any method other than the method employed in the embodiment. For example, where a display device is arranged to show the remaining amount of tape or used amount of tape by rendering some of an "n" number of display elements operative, the same advantage as that of the embodiment described can be attained by arranging the display elements to be individually operable when the computation output is precise and by arranging a plurality of them to become collectively operative when the computation output is not precise (i.e. when it is coarse).

The embodiment described employs an analog circuit arrangement. However, the invention is of course applicable to an apparatus of the type using a micro-computer or the like. Further, the range T1-T3 shown in FIG. 3 may be more finely or coarsely divided as desired.

What is claimed is:

1. An information signal recording and/or reproducing apparatus for recording and/or reproducing an information signal on or from a tape-shaped record bearing medium wound around a pair of reels by allowing the record bearing medium to travel in a longitudinal direction thereof, said information signal recording and/or reproducing apparatus comprising:
   (a) detecting means for detecting a rotating speed of at least one of said pair of reels to produce a first information;
   (b) computing means for computing an amount of a portion of said tape-shaped record bearing medium wound on one of said pair of reels based on said first information to produce a second information;
   (c) display means for making a display in response to said second information; and
   (d) changing means for changing a display step of said second information by said display means on the basis of said first information.

2. An apparatus according to claim 1, wherein said changing means includes a generation circuit for generating an indication information indicative of said display step, and a changing circuit for changing said indication information based on said second information.

3. An apparatus according to claim 2, wherein said changing means further includes a sample-and-hold circuit arranged to sample-and-hold said second information, and a determining circuit arranged to determine timing for sample by said sampling-and-hold circuit on the basis of said indication information.

4. An apparatus according to claim 3, wherein said determining circuit includes an adder arranged to add said indication information on an output information of said sample-and-hold circuit, and a comparator arranged to compare said second information with an output information of said adder.

5. An information signal recording and/or reproducing apparatus for recording and/or reproducing an information signal on or from a tape-shaped record bearing medium wound around a pair of reels by allowing the taped-shaped record bearing medium to travel in a longitudinal direction thereof, said information signal recording and/or reproducing apparatus comprising:
   (a) detecting means for detecting a rotating speed of at least one of said pair of reels to produce a first information;
   (b) computing means for computing an amount of a portion of said tape-shaped record bearing medium wound on one of said pair of reels based on said first information to produce a second information;
   (c) quantization means for quantizing said second information to produce a quantized information;
   (d) display means for making a display based on the quantized information; and
   (e) changing means for changing a step of the quantization of said quantization means based on said first information.

6. An apparatus according to claim 5, wherein said quantiziation means includes a generation circuit for generating an indication information indicative of the step of quantization, and said changing means is arranged to change said indication information based on said second information.

7. An apparatus according to claim 6, wherein said quantization means further includes a sample-and-hold circuit arranged to sample-and-hold said second information, and a determining circuit arranged to determine timing for sampling by said sample-and-hold circuit on the basis of said indication information.

8. An apparatus according to claim 7, wherein said determining circuit includes an adder arranged to add said indication information on an output information of said sample-and-hold circuit, and a comparator arranged to compare said second information with an output information of said adder.

9. An information signal recording and/or reproducing apparatus for recording and/or reproducing an information signal on or from a tape-shaped record bearing medium wound around a pair of reels by allowing the tape-shaped record bearing medium to travel in a longitudinal direction thereof, said information signal recording and/or reproducing apparatus comprising:
   (a) detecting means for detecting a rotating speed of at least one of said pair of reels to produce a first information;
   (b) computing means for computing an amount of a portion of said tape-shaped record bearing medium wound on one of said pair of reels based on said first information to produce a second information;
   (c) display means for making a display in response to said second information; and
   (d) inhibiting means for inhibiting a renewing of the display of said display means when said second information changes in a predetermined direction related to a direction in which said tape-shaped record bearing medium travels.

10. An information signal recording and/or reproducing apparatus for recording and/or reproducing an information signal on or from a tape-shaped record bearing medium wound around a pair of reels by allowing the tape-shaped record bearing medium to travel in a longitudinal direction thereof, said information signal recording and/or reproducing apparatus comprising:
 (a) detecting means for detecting a rotating speed of at least one of said pair of reels to produce a first information;
 (b) computing means for computing an amount of a portion of said tape-shaped record bearing medium wound on one of said pair of reels based on said first information to produce a second information;
 (c) sampling means for sampling said second information to produce a sampled information;
 (d) determining means for determining timing for sampling by said sampling means in response to said second information; and
 (e) display means for making a display on the basis of said sampled information.

11. An apparatus according to claim 10, wherein said determining means includes an addition circuit which is arranged to add a predetermined value on said sampled information; a comparison circuit which is arranged to compare said second information with an output information of said addition circuit; and a circuit arranged to form sampling pulses for said sampling means on the basis of an output of said comparison circuit.

* * * * *

UNITED STATES PATENT AND TRADEMARK OFFICE
CERTIFICATE OF CORRECTION

PATENT NO. : 4,696,440

DATED : September 29, 1987

INVENTOR(S) : Isao Harigaya et al

It is certified that error appears in the above-identified patent and that said Letters Patent is hereby corrected as shown below:

Title Page:

In the heading of the Patent, it should read:

--[21] Appl. No.: 919,546

Signed and Sealed this

Eighth Day of March, 1988

Attest:

DONALD J. QUIGG

Attesting Officer

Commissioner of Patents and Trademarks